(12) United States Patent
Bonyadi

(10) Patent No.: US 10,919,001 B2
(45) Date of Patent: *Feb. 16, 2021

(54) MICROPOROUS POLYAMIDE-IMIDE MEMBRANES

(71) Applicant: ENTEGRIS, INC., Billerica, MA (US)

(72) Inventor: Sina Bonyadi, Billerica, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/679,855

(22) Filed: Nov. 11, 2019

(65) Prior Publication Data

US 2020/0070105 A1 Mar. 5, 2020

Related U.S. Application Data

(62) Division of application No. 15/032,833, filed as application No. PCT/US2014/065699 on Nov. 14, 2014, now Pat. No. 10,532,329.

(Continued)

(51) Int. Cl.
| | |
|---|---|
| *B01D 71/64* | (2006.01) |
| *B01D 61/14* | (2006.01) |
| *B01D 69/02* | (2006.01) |
| *B01D 67/00* | (2006.01) |

(52) U.S. Cl.
CPC .......... *B01D 71/64* (2013.01); *B01D 61/147* (2013.01); *B01D 69/02* (2013.01);
(Continued)

(58) Field of Classification Search
CPC ...... B01D 71/64; B01D 71/147; B01D 69/02; B01D 2323/22; B01D 2325/021;
(Continued)

(56) References Cited

U.S. PATENT DOCUMENTS

| | | |
|---|---|---|
| 4,900,449 A | 2/1990 | Kraus |
| 2007/0036959 A1 | 2/2007 | Yamato |

(Continued)

FOREIGN PATENT DOCUMENTS

| | | |
|---|---|---|
| EP | 0228072 B1 | 8/1991 |
| EP | 1672011 A4 | 4/2009 |

(Continued)

OTHER PUBLICATIONS

IPRP from International Application No. PCT/US2014/065699 mailed Mar. 18, 2016.

(Continued)

*Primary Examiner* — Bobby Ramdhanie
*Assistant Examiner* — Donovan Bui-Huynh
(74) *Attorney, Agent, or Firm* — Entegris, Inc

(57) ABSTRACT

Microporous polyamide-imide membranes and methods for making them are disclosed. The microporous membrane includes polyamide-imide polymer, wherein the membrane has an HFE bubble point, and an IPA flow-time. The microporous membrane has an HFE bubble point from about 25 psi to about 200 psi and has an IPA flow-time from about 400 second to about 40,000 seconds. Another microporous polyamide-imide membrane includes a polyamide-imide polymer, wherein the membrane has a HFE bubble point from about 25 psi to about 200 psi. The membrane is asymmetric- and has a tight layer with a thickness of ≤10 microns. Filter and purification devices incorporating such devices are also disclosed.

10 Claims, 13 Drawing Sheets

Related U.S. Application Data

(60) Provisional application No. 61/904,029, filed on Nov. 14, 2013.

(52) U.S. Cl.
 CPC ...... *B01D 67/0011* (2013.01); *B01D 67/0016* (2013.01); *B01D 2323/22* (2013.01); *B01D 2325/021* (2013.01); *B01D 2325/022* (2013.01); *B01D 2325/04* (2013.01)

(58) Field of Classification Search
 CPC .......... B01D 2325/022; B01D 2325/04; B01D 67/011; B01D 67/0016; A22C 2013/0063; A63B 2209/02; B32B 2266/0257; B32B 17/10724; B32B 2262/0261; B32B 2262/0269; B32B 2264/0264; B32B 2264/0271; C09K 2323/025; C09K 15/22; C09K 2200/0695; C08G 65/33331; C08G 73/14; C08G 18/3846; C08G 81/028; C09J 2477/00; G02F 1/133723
 See application file for complete search history.

(56) References Cited

U.S. PATENT DOCUMENTS

| | | |
|---|---|---|
| 2012/0061314 A1 | 3/2012 | Choi |
| 2015/0005405 A1 | 1/2015 | Ishihara |

FOREIGN PATENT DOCUMENTS

| | | |
|---|---|---|
| GB | 2199786 B | 3/1990 |
| JP | 62258707 A | 11/1987 |
| JP | 63141607 | 6/1988 |
| JP | 4349927 A | 12/1992 |
| JP | 016350 | 1/1994 |
| JP | 06165819 | 6/1994 |
| JP | 07232044 | 9/1995 |
| JP | 2007154028 A | 6/2007 |
| JP | 2010110686 A | 5/2010 |
| JP | 2010227757 A | 10/2010 |
| JP | 2011052175 | 3/2011 |
| JP | 2013142156 A | 7/2013 |
| WO | 2008153117 | 12/2008 |
| WO | 2012074487 W | 6/2012 |
| WO | 2012112123 W | 10/2012 |
| WO | 2015073820 W | 5/2015 |

OTHER PUBLICATIONS

ISR/WO from International Application No. PCT/US2014/065699 mailed Feb. 10, 2015.
ISR/WO from International Application No. PCT/US2015/023538 mailed Jul. 6, 2015.
Qui et al., "Dehydration of ethanol-water mixture using asymmetric hollow fiber membranes from commercial polymides" Journal of Membrane Science, 327 (1-2): 96-103; Feb. 5, 2009.

MICROPOROUS POLYAMIDE-IMIDE MEMBRANES

CROSS-REFERENCE TO RELATED APPLICATIONS

This application is a Divisional Application of U.S. patent application Ser. No. 15/032,833, now U.S. Pat. No. 10,532,329, which is the U.S. National Stage of International Application No. PCT/US2014/065699, filed Nov. 14, 2014, which designates the U.S., published in English, and claims the benefit of the U.S. provisional application No. 61/904,029, filed Nov. 14, 2013, the entire teachings of the above applications are incorporated herein by reference.

BACKGROUND OF THE INVENTION

Field of the Invention

The invention includes embodiments that relate to membranes. Particularly, the invention includes embodiments that are directed to polyamide-imide membranes, method of making such, and devices using such.

Description of Related Art

Some polyamide-imide (PAI) membranes and methods of making them are known. However, with microfiltration membrane characterization tests (such as bubble points, bacteria retention) and distinction between the various possible polysulfones, PAI membranes are still needed. Strong, chemically inert and heat stable polyamide-imide membranes in the microporous range for removing particles and ions from liquids and fluids are still needed.

SUMMARY

The purpose and advantages of embodiments of the invention will be set forth and apparent from the description that follows, as well as will be learned by practice of the embodiments of the invention. Additional advantages will be realized and attained by the methods and systems particularly pointed out in the written description and claims hereof, as well as from the appended drawings.

An embodiment of the invention provides a microporous membrane. The microporous membrane includes a polyamide-imide polymer, wherein the microporous membrane has a bubble point and an IPA flow-time. The microporous membrane has an HFE bubble point from about 25 psi to about 200 psi and an IPA flow-time from about 400 seconds to about 40,000 seconds.

A second embodiment of the invention provides another membrane. The membrane includes a polyamide-imide polymer, wherein the membrane has a bubble point and an IPA flow-time. The membrane has an HFE bubble point from about 25 psi to about 200 psi. The membrane is microporous; asymmetric and has a tight layer with a thickness of ≤10 microns.

A third embodiment of the invention provides a filtration device. The filtration device includes a filter incorporating a microporous membrane. The microporous membrane includes a polyamide-imide polymer, wherein the microporous membrane has a bubble point and an IPA flow-time. The microporous membrane has an HFE bubble point from about 25 psi to about 200 psi and an IPA flow-time from about 400 seconds to about 40,000 seconds.

The accompanying figures, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION OF EXEMPLARY EMBODIMENTS

Figure 1:
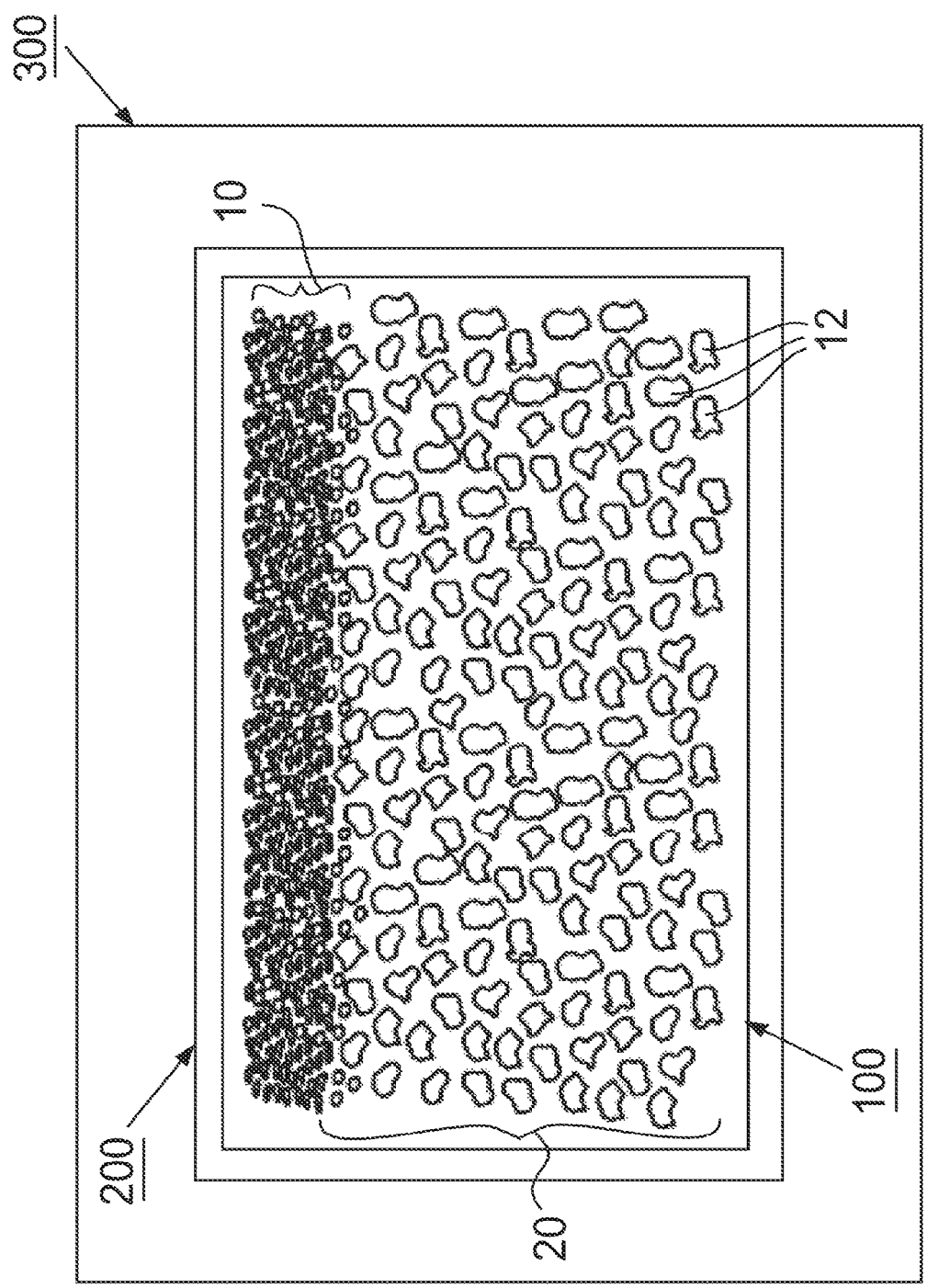
FIG. 1 is a schematic representation of a membrane in accordance with an embodiment of the invention.

Reference will now be made in detail to exemplary embodiments of the invention, which are illustrated in the accompanying figures and examples. Referring to the drawings in general, it will be understood that the illustrations are for the purpose of describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group. Furthermore, when any variable occurs more than one time in any constituent or in formula, its definition on each occurrence is independent of its definition at every other occurrence. Also, combinations of substituents and/or variables are permissible only if such combinations result in stable compounds.

It must also be noted that as used herein and in the appended claims, the singular forms "a", "an", and "the" include plural reference unless the context clearly dictates otherwise. Thus, for example, reference to a "non-solvent" is a reference to one or more non-solvents and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of embodiments of the present invention. All publications mentioned herein are incorporated by reference in their entirety. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result).

With reference to FIG. 1, a microporous membrane 100 is described. The microporous membrane 100 includes one or more polyamide-imide polymers wherein the microporous membrane 100 has a bubble point and an IPA flow-time. More specifically, the microporous membrane 100 has an HFE bubble point from about 25 psi to about 200 psi and an IPA flow-time from about 400 seconds to about 40,000 seconds. The microporous membrane 100 has an open pore 12 structure and the pores 12 are interconnected allowing liquid or gas filtration.

Test methods described herein may be used to characterize the bubble point and flow time of the membranes as well as the test conditions for these values. The bubble point used to characterize the membranes 100 refers to a mean bubble point using an air flow porisometer. ASTM F316-03(2011) Standard Test Methods for Pore Size Characteristics of Membrane Filters by Bubble Point and Mean Flow Pore Test were used to calculate bubble point. In some cases, microporous membrane bubble points refer to a mean bubble point measured by an HFE-7200 (available from 3M™, St. Paul, Minn.). HFE-7200 bubble points can be converted into IPA bubble point values by multiplying the HFE-7200 value measured bubble point by 1.5. HFE-7200 by 3M™ is ethoxy-nonafluorobutane and has a reported surface tension of 13.6 mN/m at 25° C.

IPA flow time is the time to flow 500 milliliters of isopropyl alcohol, at a temperature of 21° C. and pressure of 97,900 Pa (about 0.1 MPa, or about 1 bar, or about 14.2 psid), through a 47 millimeter disk of the microporous membrane with an area of 12.5 $cm^2$.

It should be appreciated that embodiments of the inventions include microporous membranes 100 with varying HFE bubble points. In an embodiment, the HFE bubble point ranges from about 25 pounds per square inch pressure to about 150 pounds per square inch pressure. In another embodiment, the HFE bubble point ranges from about 53 pounds per square inch pressure to about 99 pounds per square inch pressure. In another embodiment, the HFE bubble point ranges from about 38 pounds per square inch pressure to about 75 pounds per square inch pressure. In yet another embodiment, the HFE bubble point ranges from about 32 pounds per square inch pressure to about 38 pounds per square inch pressure.

Embodiments of the invention include microporous membranes 100 with various ranges of IPA flow times. In an embodiment, the IPA flow time ranges from about 4225 seconds to about 7535 seconds. In another embodiment, the IPA flow time ranges from about 4090 seconds to about 5580 seconds. In yet another embodiment, the IPA flow time ranges from about 3445 seconds to about 4225 seconds. In another embodiment, the IPA flow time ranges from about 2860 seconds to about 3445 seconds.

TABLE 1

NMP stands for N-methyl-2-pyrrolidone, EG for ethylene glycol and TEG for tri-ethylene glycol.

| Examples | Dope formulation | Coagulants | HFE Bubble point (psi) | IPA flow-time (sec) |
|---|---|---|---|---|
| 1a - FIG. 2 | NMP/EG/Polyamide-imide polymer (79/8/13 weight %) | NMP/Water (80/20 weight %) | 26.66 | 5665 |
| 1b - FIG. 3 | | NMP/Water (75/25 weight %) | 30.32 | 4035 |
| 1c - FIG. 4 | | NMP/Water (70/30 weight %) | 53.52 | 4090 |
| 1d- | | NMP/Water (65/35 weight %) | 99.10 | 7535 |
| 2a - FIG. 6 | NMP/EG/Polyamide-imide polymer (75/12/13 weight %) | NMP/Water (80/20 weight %) | 24.96 | 2860 |
| 2b - FIG. 7 | | NMP/Water (75/25 weight %) | 32.45 | 3445 |
| 2c - FIG. 8 | | NMP/Water (70/30 weight %) | 37.90 | 4245 |
| 2d - FIG. 9 | | NMP/Water (65/35 weight %) | 75.38 | 5580 |
| | NMP/TEG/Polyamide-imide polymer (67/20/13 weight %) | NMP/Water (50/50 weight %) | 140.00 | 20,000 |

Another embodiment includes a microporous membrane 100 with an HFE bubble point between 25 psi and 32 psi and an IPA flow time between 2860 seconds and 3445 seconds. Another embodiment of the microporous membrane 100 includes an HFE bubble point between 32 psi and 38 psi and an IPA flow time of between 3445 seconds and 4245 seconds. Yet another embodiment of the microporous membrane 100 includes an HFE Bubble point between 38 psi and 75 psi and an IPA flow time between 4245 seconds and 5580 seconds. Another embodiment includes a microporous membrane 100 with an HFE bubble point between 53 psi and 99 psi and an IPA flow time between 4090 seconds and 7535 seconds.

Figures 2A, 2B:
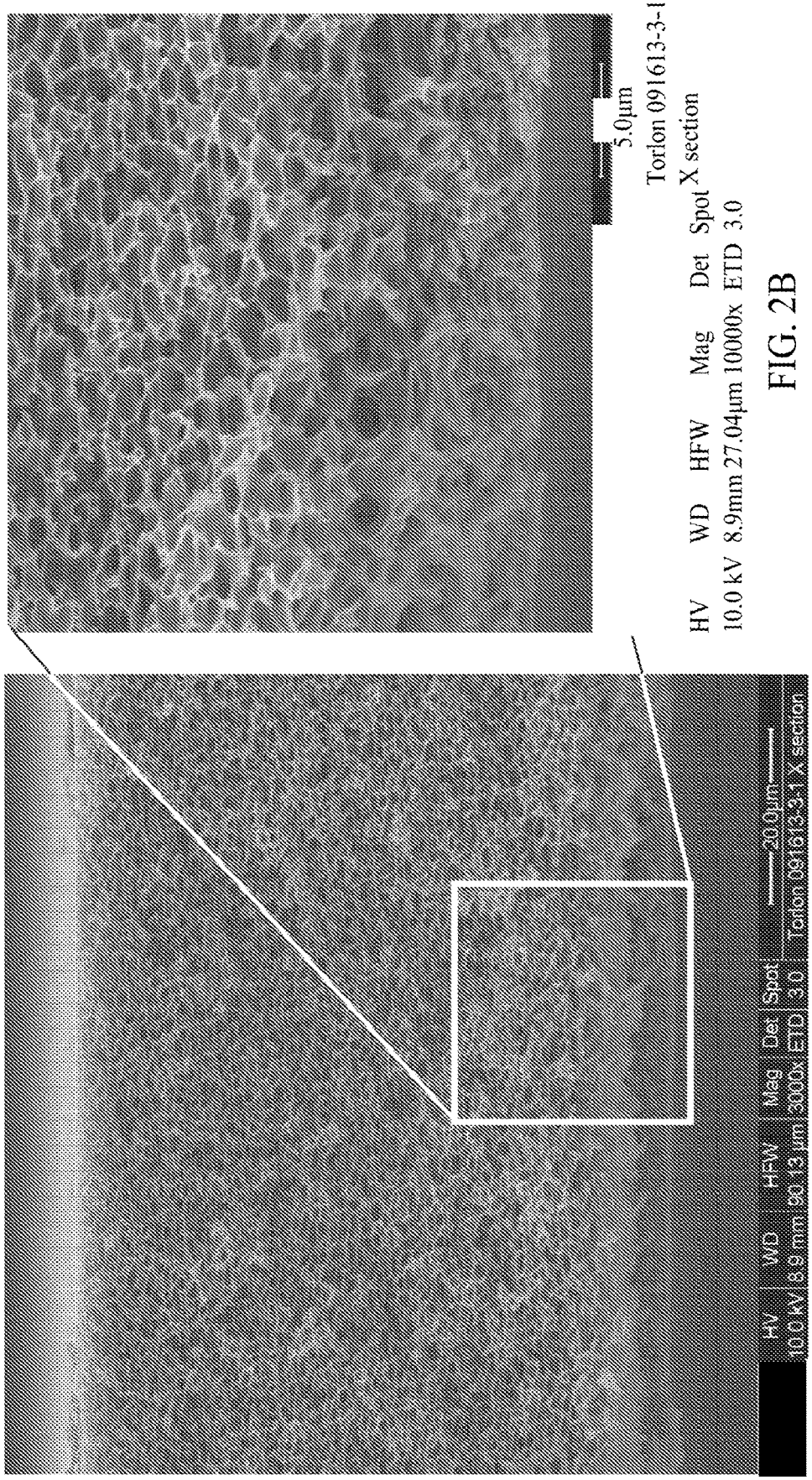
FIGS. 2A and 2B are scanning electronic microscopic (SEM) micrographs of a symmetric membrane in accordance with an embodiment of the invention.
Figure 3B:
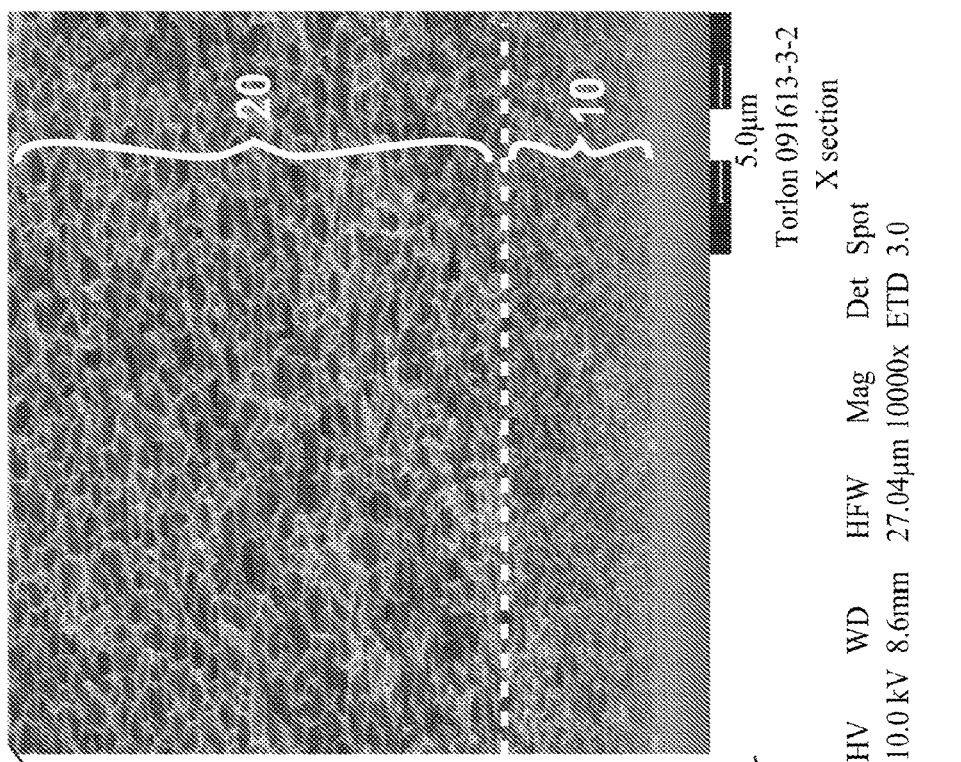
FIGS. 3A and B are SEM micrographs of an asymmetric membrane in accordance with an embodiment of the invention.
Figure 3A:
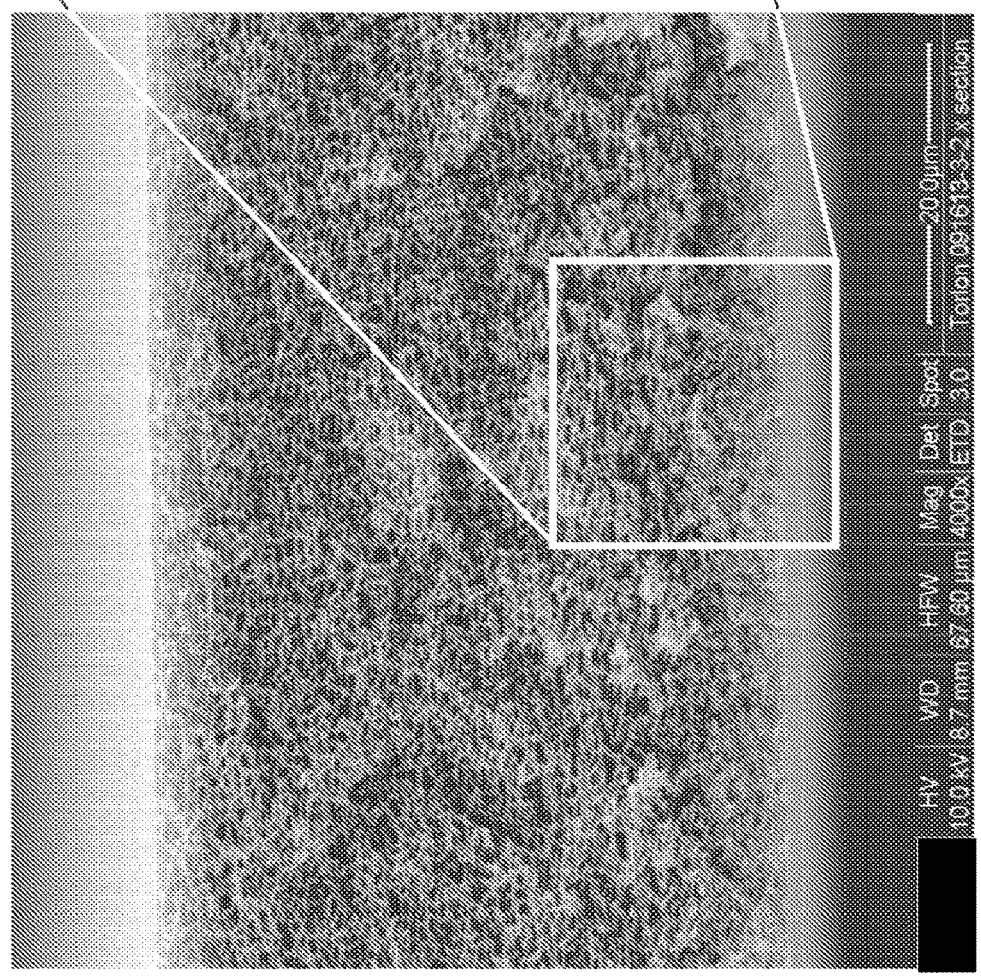

It should be appreciated that embodiments of the invention include microporous membranes 100 that are symmetric as in FIG. 2A or asymmetric as in FIG. 3A. Symmetric membranes refer to porous membranes where the pore 12 size and/or structure are substantially the same throughout the thickness of the membrane such as FIG. 2A or FIG. 6A. The term "asymmetric" refers to a porous membrane in which the pore 12 size and/or structure are not the same from one side of the membrane to the other side as in FIGS. 3-4. When the microporous membrane is asymmetric, such as in FIGS. 3-4, and 7-8, the asymmetric microporous membranes 100 have a tight layer 10 (bottom) and an open layer 20 (top).

Examples 1a-1d of the polyamide-imide microporous membranes 100 made from the dope formulation are shown in Table 1. The polyamide-imide (PAI) polymer dope formulation includes one or more polyamide-imide (PAI) polymers, one or more solvents, and one or more non-solvents. A particular embodiment of the PAI polymer dope formulation includes N-methylpyrrolidone (NMP) as the solvent, ethylene glycol (EG) as a non-solvent, and polyamide-imide polymer. It should be appreciated that the membrane 100 also includes the reaction product of the one or more solvents with each other, the reaction product of the one or more non-solvents with the each other, the reaction product of the one or more PAI polymers with each other, and the reaction product of the one or more solvents, one or more non-solvents, and one or more PAI polymers with each other.

FIG. 2A and FIG. 2B are SEM micrographs showing cross-sectional microstructure of a symmetric membrane made according to Example 1a in Table 1. Torlon® was used as the polyamide-imide polymer (PAI). The FIG. 2B magnification shows the symmetrical nature of the membrane 100 and absence of a tight layer 10.

FIG. 3A and FIG. 3B. are SEM micrographs of an asymmetric membrane 100 of another embodiment of the invention, made according to Example 1b of Table 1, with a tight layer 10 (located beneath the dashed white line) of about ≤5 microns (NMP/water (75/25 weight %) and an open layer 20 (located above the dashed white line). FIG. 3B is a cross-sectional magnification of FIG. 3A showing the asymmetrical nature of the membrane 100 with the tight layer 10 and the open layer 20.

Figure 4B:
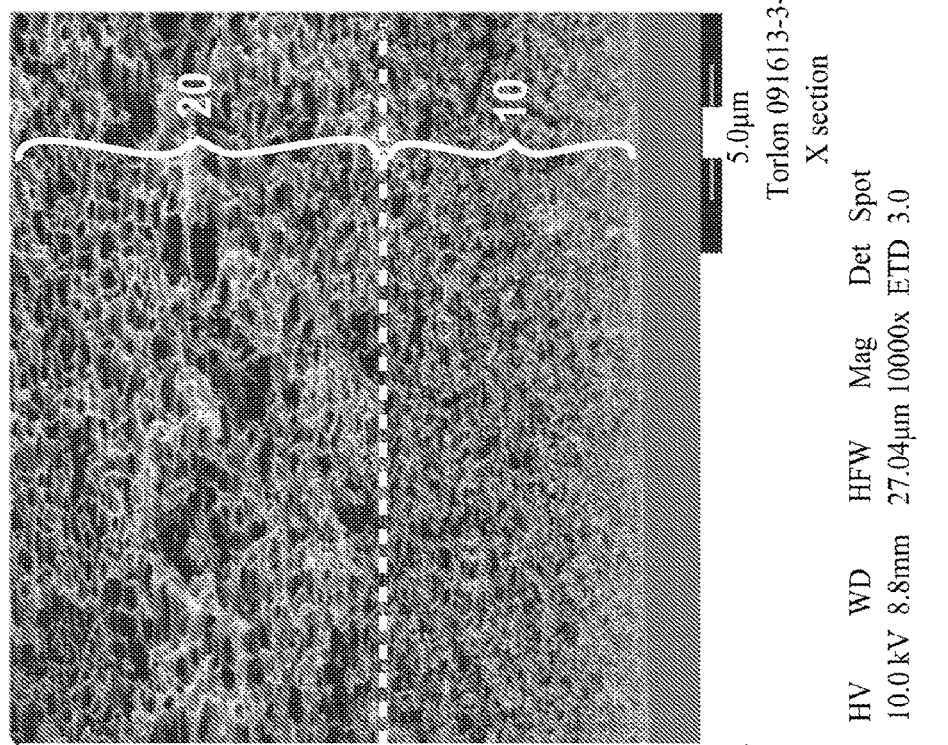
FIGS. 4A and 4B are SEM micrographs of another asymmetric membrane in accordance with an embodiment of the invention.
Figure 4A:
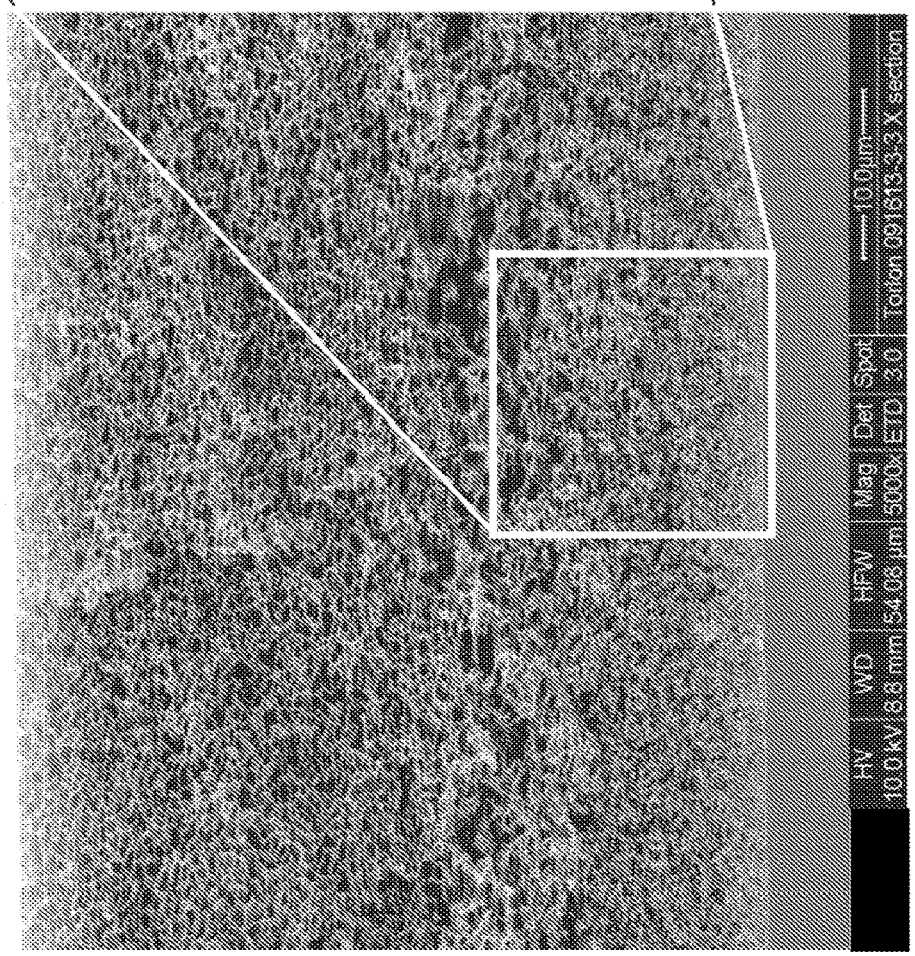

FIG. 4A and FIG. 4B are SEM micrographs showing cross-sectional microstructure of yet another embodiment of an asymmetric membrane 100, made according to Example 1c of Table 1, with a thickness of the tight layer 10 (dashed white line) of about ≤10 microns (NMP/Water (70/30 weight %) and the open layer 20. FIG. 4B is a cross-sectional magnification of FIG. 4A showing the asymmetrical nature of the membrane 100 with the tight layer 10 and the open layer 20.

Figure 5A:
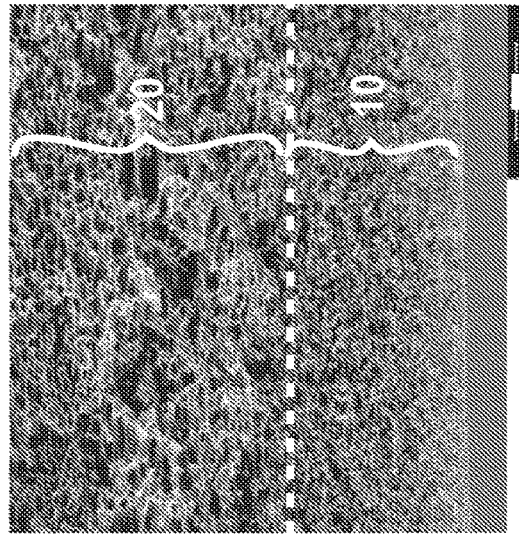
FIGS. 5A, B, and C are SEM micrographs showing the tight layer evolution in membranes as a function of water concentration in the coagulation bath in accordance with an embodiment of the invention.
Figure 5B:
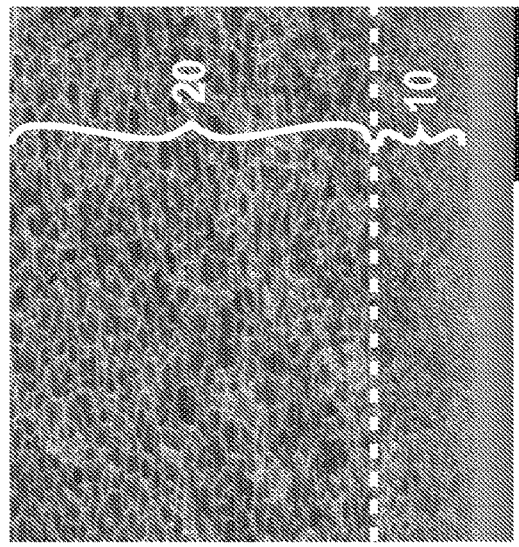
Figure 5C:
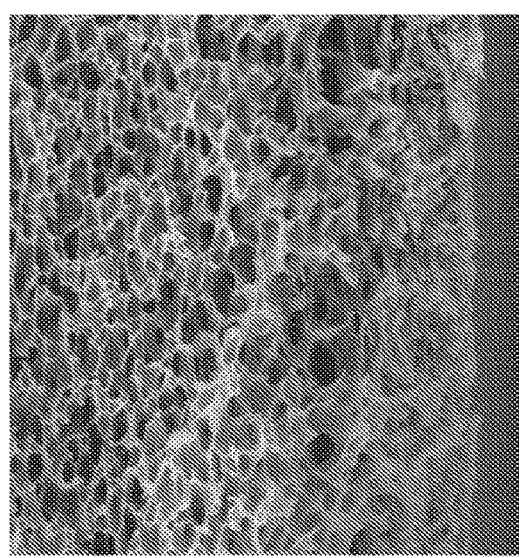
Figure 6B:
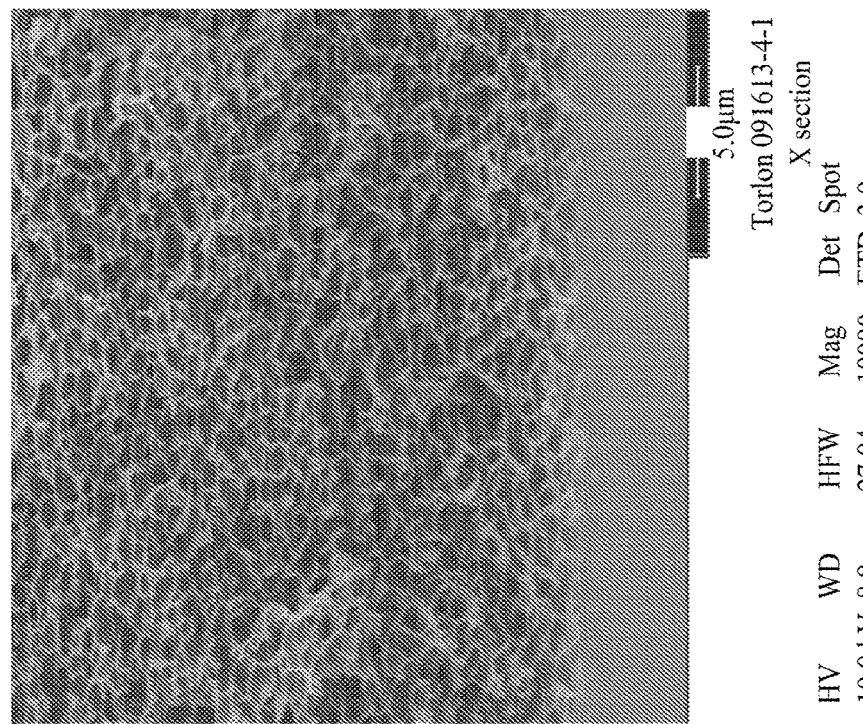
FIGS. 6A and B are SEM micrographs of a symmetric membrane in accordance with an embodiment of the invention.
Figure 6A:
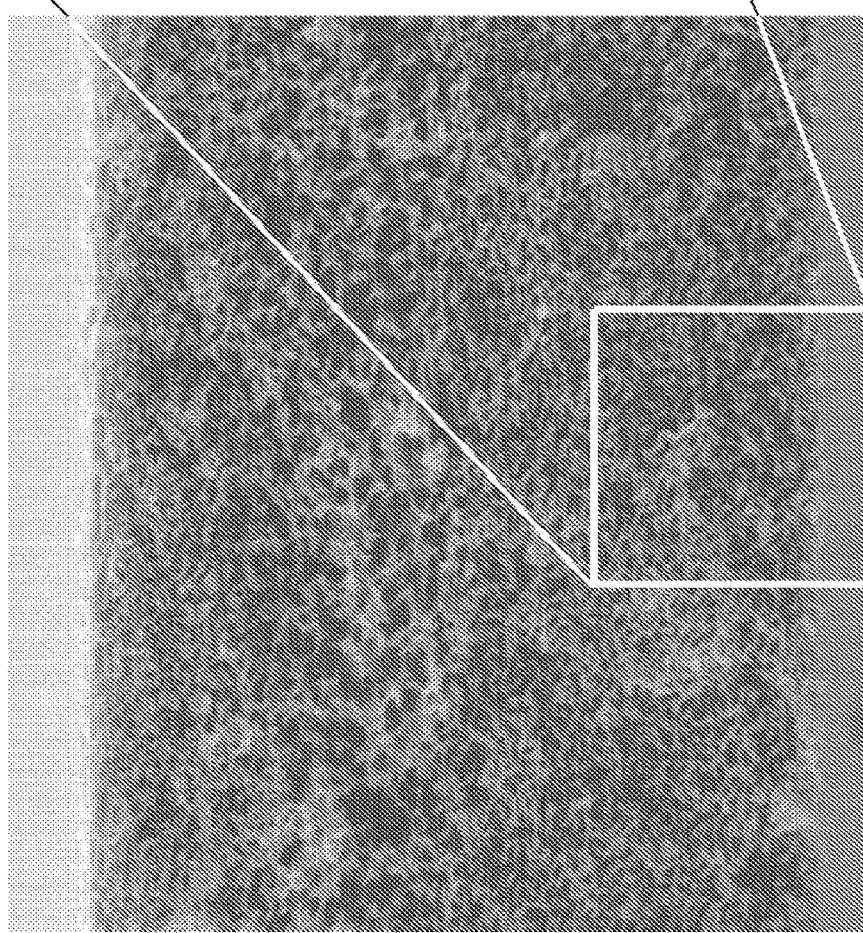
Figure 7B:
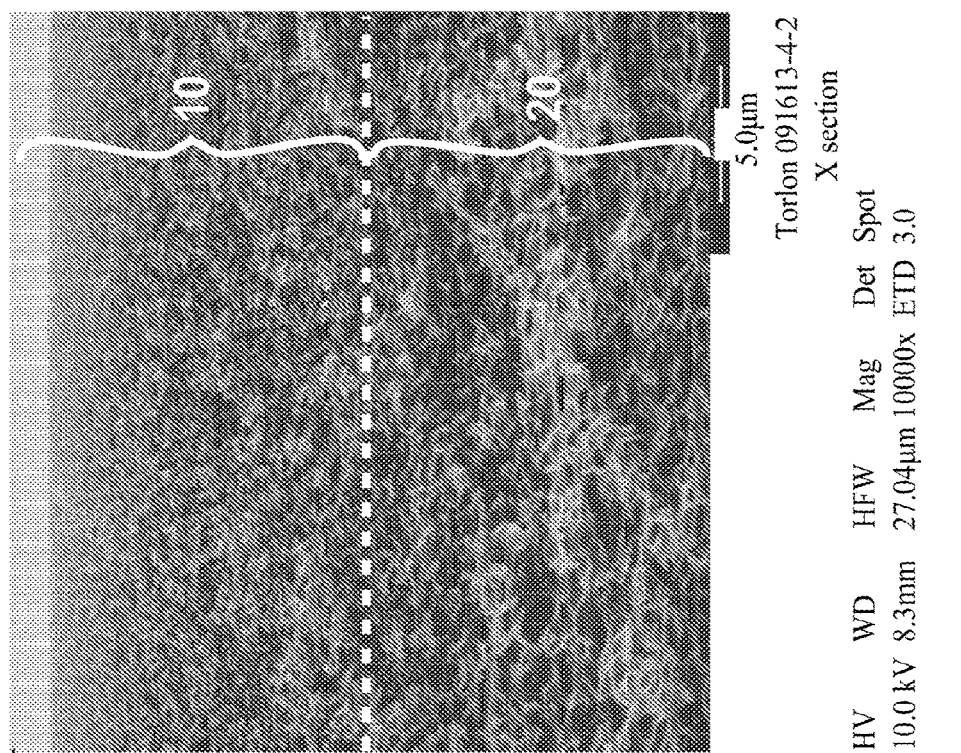
FIGS. 7A and B are SEM micrographs of an asymmetric membrane in accordance with an embodiment of the invention.
Figure 7A:
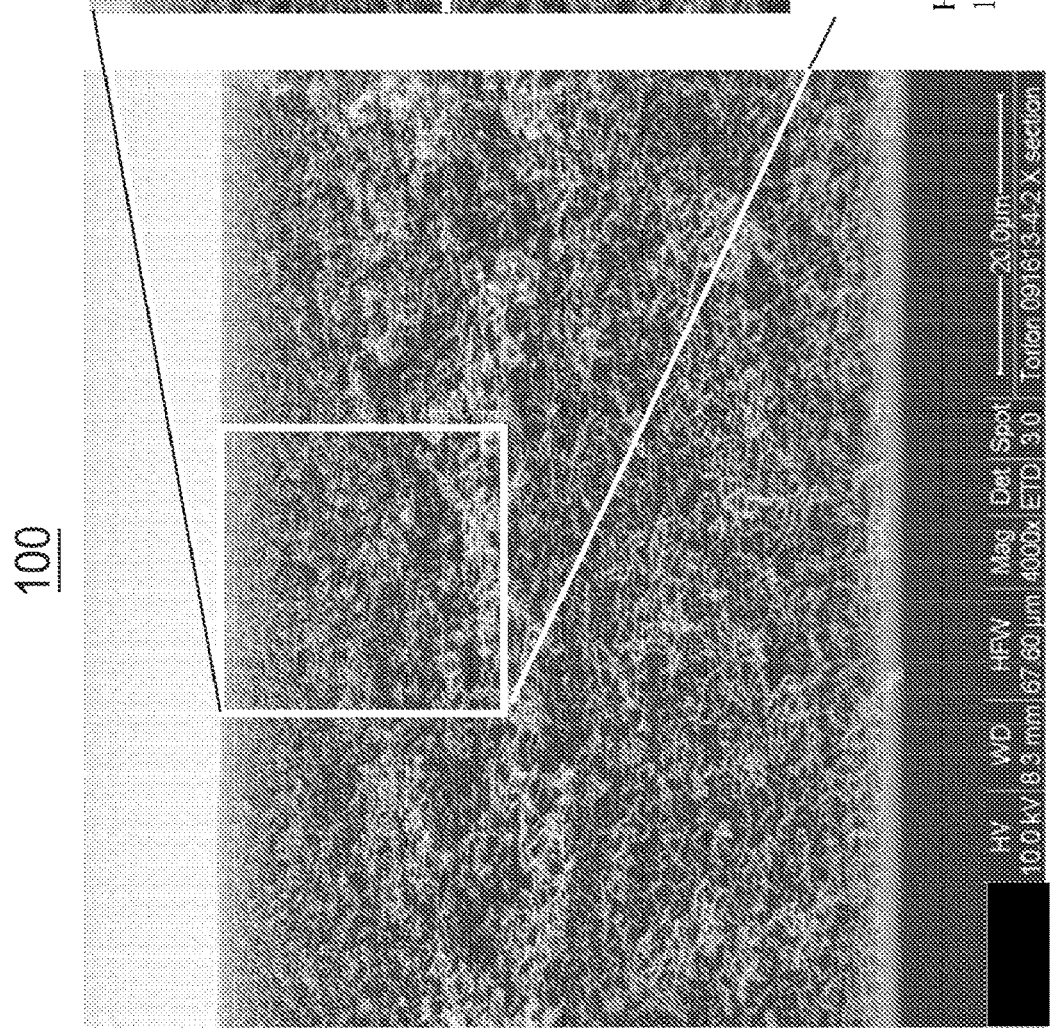
Figures 8A, 8B:
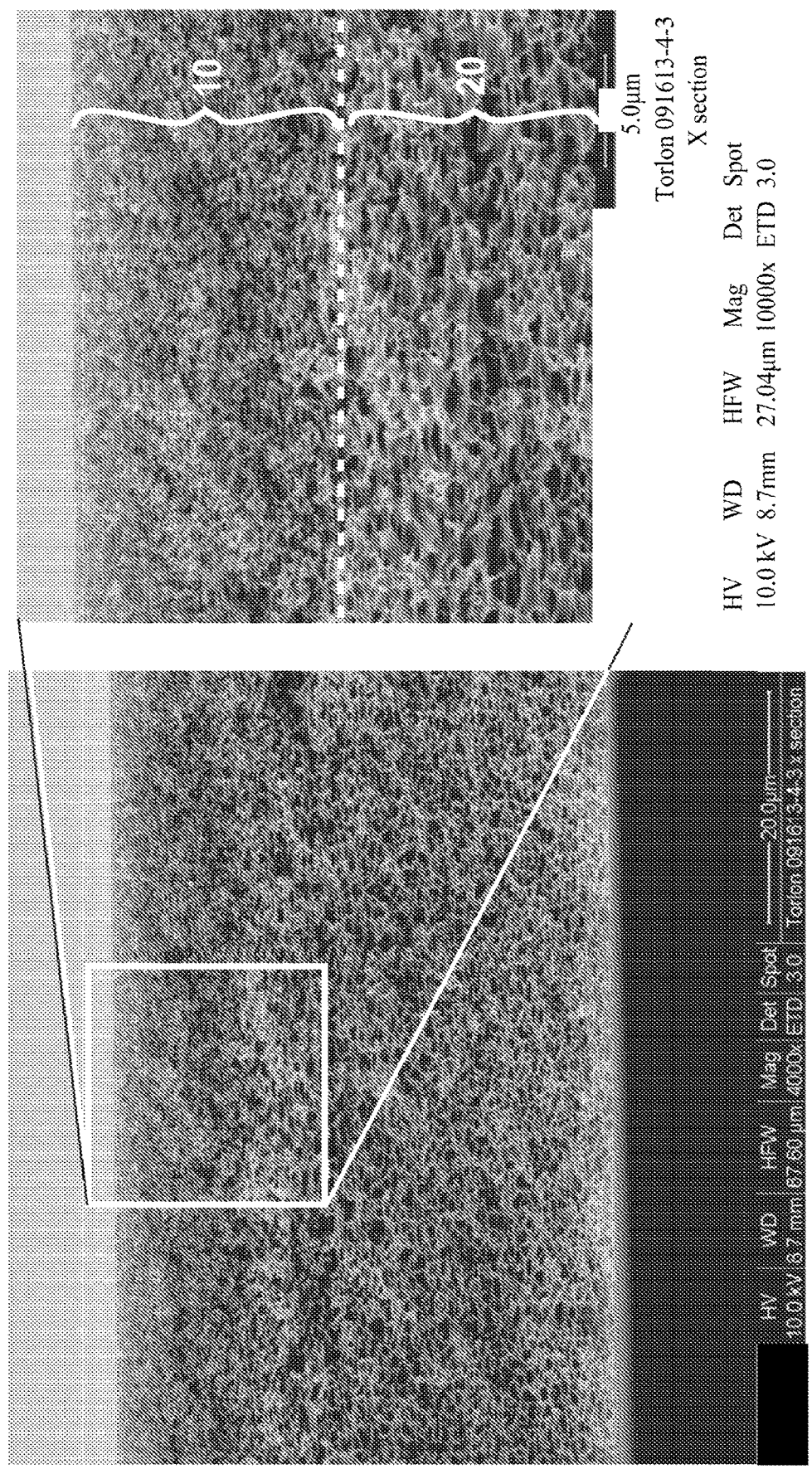
FIGS. 8A and B are SEM micrographs of another asymmetric membrane in accordance with an embodiment of the invention.
Figure 9B:
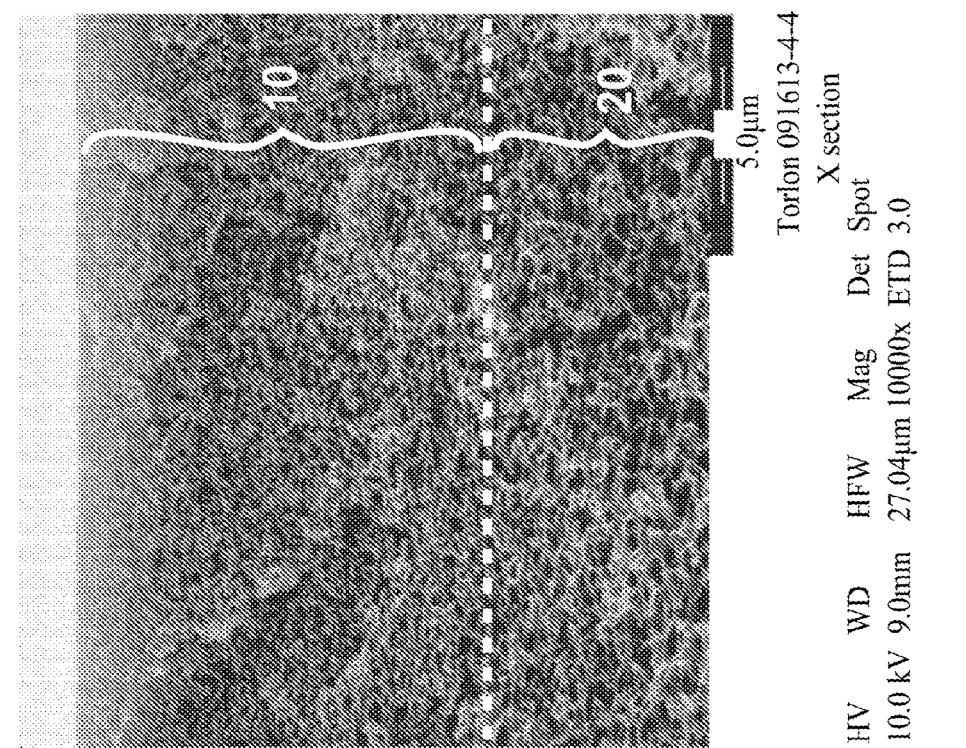
FIGS. 9A and B are SEM micrographs of another asymmetric membrane in accordance with an embodiment of the invention.
Figure 9A:
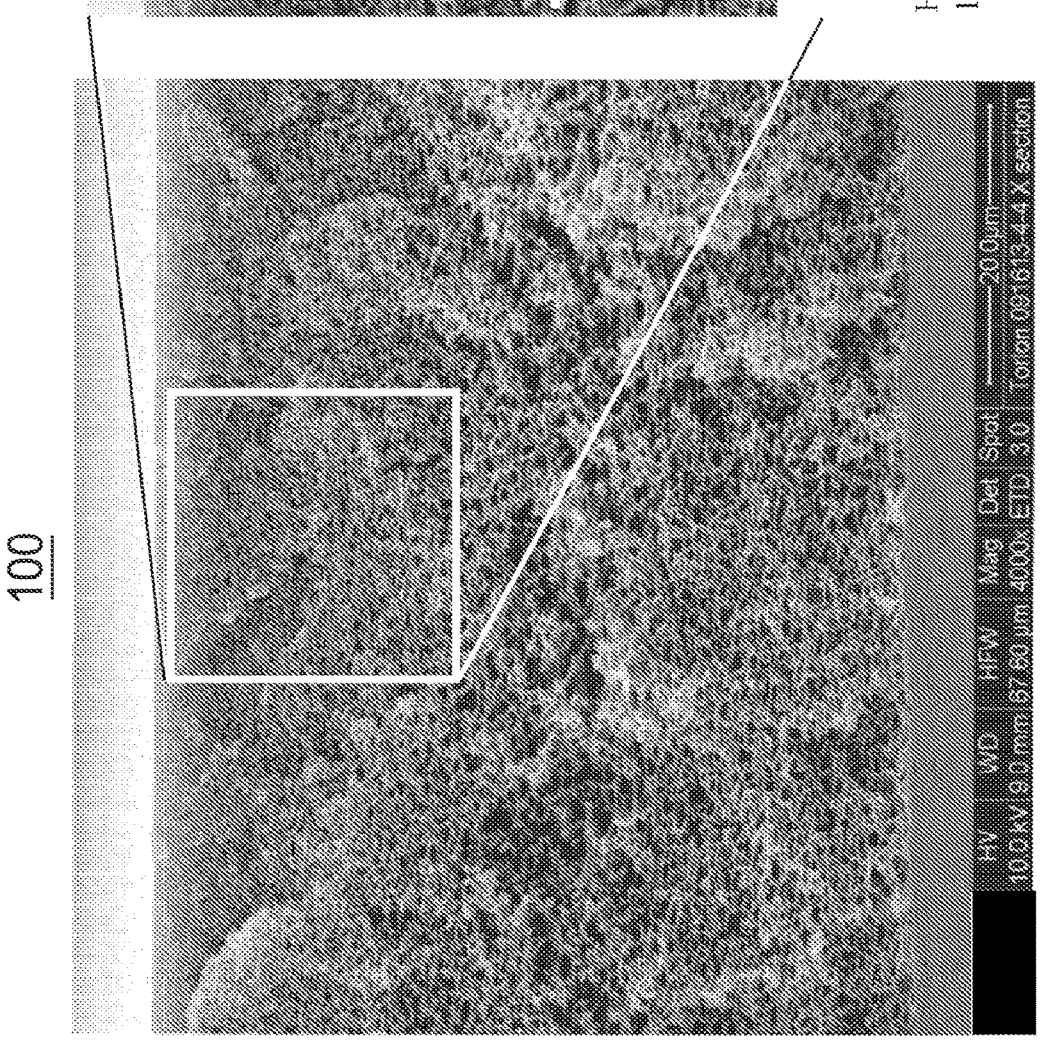

FIG. 5A-C are SEM micrographs showing the tight layer evolution in membranes 100 as a function of water concentration in the coagulation bath through Examples 1a-1c in Table 1. FIG. 5A-C show effects of increasing the water concentration in an external coagulation bath in embodiments of the invention. As demonstrated in FIG. 5A-C, the thickness of the tight layer 10 increases as the amount of water in the coagulation bath increases. FIG. 5A is a symmetric membrane in (NMP/Water (80/20) weight %). FIG. 5B is an asymmetric membrane with a thickness of the tight layer 10 (beneath the dashed white line) of about ≤5 microns (NMP/Water (75/25 weight %); and FIG. 5C is an asymmetric membrane with a thickness of the tight layer 10 (beneath the dashed white line) about ≤10 microns (NMP/water (70/30 weight %). Thus, the thickness of the tight layer 10 increases as the amount of water in the coagulation bath increases. Another embodiment of asymmetric membrane 100 includes a tight layer 10 with a thickness of about ≤8 microns. Examples 2a-2d are other examples with dope formulations differing from Examples 1a-d as shown in Table 1 with increased amount of water in the coagulation bath. FIGS. 6A and 6B are SEM micrographs of an embodiment of a symmetric membrane 100 of Example 2a. The FIG. 6B magnification shows the symmetrical nature of the membrane 100 and an absence of a tight layer. FIGS. 7A and 7B are SEM micrographs of an embodiment of an asymmetric membrane 100 of Example 2b with a tight layer 10 (above the dashed white line) having a thickness about ≤5 microns. FIG. 7B is a cross-sectional magnification of FIG. 7A showing the asymmetrical nature of the membrane 100 with the tight layer 10 and the open layer 20. FIGS. 8A and B are SEM micrographs of another embodiment of an asymmetric membrane 100 of Example 2c with a tight layer 10 (above the dashed white line) having a thickness about ≤10 microns. FIG. 8B is a cross-sectional magnification of FIG. 8A showing the asymmetrical nature of the membrane 100 with the tight layer 10 and the open layer 20. FIGS. 9A and 9B are SEM micrographs of an asymmetric membrane 100 of Example 2d with a tight layer 10 (above the dashed white line) having a thickness about ≤10 microns. FIG. 9B is a cross-sectional magnification of FIG. 9A showing the asymmetrical nature of the membrane 100 with the tight layer 10 and the open layer 20.

In Examples 2a-d, as in Examples 1a-d, the HFE bubble point of the membrane 100 increased as the amount of water in the coagulation bath increased as shown in Table 1. It should be appreciated that is it within the scope of invention to make microporous membranes 100 with a combination of one or more parameters such as range of IPA flow times, HFE bubble points, as well as varying the amount of water in the coagulation bath, etc.

Another embodiment of the membrane 100 includes one or more polyamide-imide polymers, wherein the membrane 100 has an HFE bubble point from about 25 psi to about 200 psi. The membrane is asymmetric- and microporous and has a tight layer that has a thickness of ≤10 microns. In a further embodiment, the membrane 100 also has an IPA flow time in a range from about 400 seconds to about 40,000 seconds.

It should be understood that the microporous membrane 100 is not limited by its form or shape unless expressly stated and includes membranes of varying shape, form, and morphology unless expressly limited by the specification. In an embodiment, the membrane 100 includes pleated form. In another embodiment, the membrane 100 includes hollow fiber. In yet another embodiment, the membrane 100 is in the form of flat films. In another embodiment, the membrane 100 includes composite form.

It should also be appreciated that microporous membranes 100 can be incorporated in filtration or purification housings. An embodiment of the invention provides a filtration device 300 as shown in FIG. 1. The filtration device includes one or more filters 200 incorporating a microporous membrane 100. The microporous membrane includes polyamide-imide polymer, has an HFE bubble point, and an IPA flow-time. The microporous membrane has an HFE bubble point from about 25 psi to about 200 psi and has an IPA flow-time from about 400 seconds to about 40,000 seconds.

The microporous membranes 100 can be pleated and bonded, including potting, to form integral devices that permit filtration and purification of liquids and other fluids that pass through the membrane in the housing. In another embodiment, the membranes can be hollow fibers and incorporated to a housing to form integral devices that permit filtration and purification of liquids and other fluids that pass through the membrane in the housing.

Figure 13:
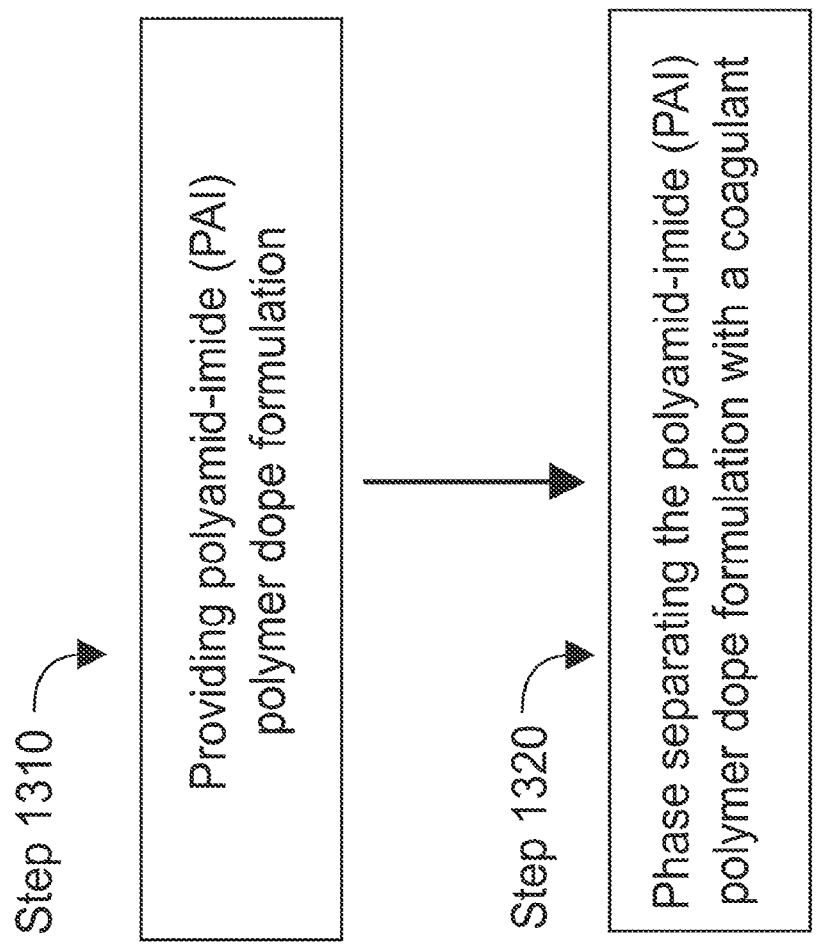
FIG. 13 is a flow chart of a method of making a membrane in accordance with embodiments of the invention.

With reference to FIG. 13, next is described an embodiment of the invention of making the membranes 100. Step 1310 includes providing polyamide-imide (PAI) polymer dope formulation. The polyamide-imide (PAI) polymer dope formulation includes one or more polyamide-imide (PAI) polymers, one or more solvents, and one or more non-solvents. The polyamide-imide (PAI) polymer dope formulation includes N-methylpyrrolidone (NMP) as the solvent, ethylene glycol (EG) as a non-solvent, and polyamide-imide polymer in a ratio range of 79(NMP)/8(EG)/13(PAI) weight % to 75(NMP)/12(EG)/13(PAI) weight %.

Although the embodiments have been described with the given dope formulations, it should be understood embodiments of the invention are not restricted to the doping formulations and include varying the dope formulations in the amount and order, either individually or in a combination of two or more thereof.

In another embodiment, the dope formulation includes a plurality of polyamide-imides which differ from each other. The plurality of polyamide-imides may have various characteristics which are similar or vary from each other. In one embodiment, the pluralities of differing polyamide-imides are in various ranges. In another embodiment, the dope formulation includes a plurality of solvents which are similar or vary from each other. In one embodiment, the pluralities of differing solvents are in various ranges. In yet another embodiment, the dope formulation includes a plurality of non-solvents which are similar or vary from each other. In one embodiment, the plurality of differing non-solvents are in various ranges.

Step 1320 includes phase separating the polyamide-imide (PAI) polymer dope formulation with a coagulant. The coagulant includes NMP and water in a ratio of 80(NMP)/20(water) weight % to 65(NMP)/35(water) weight %.

EXAMPLES

Figure 10:
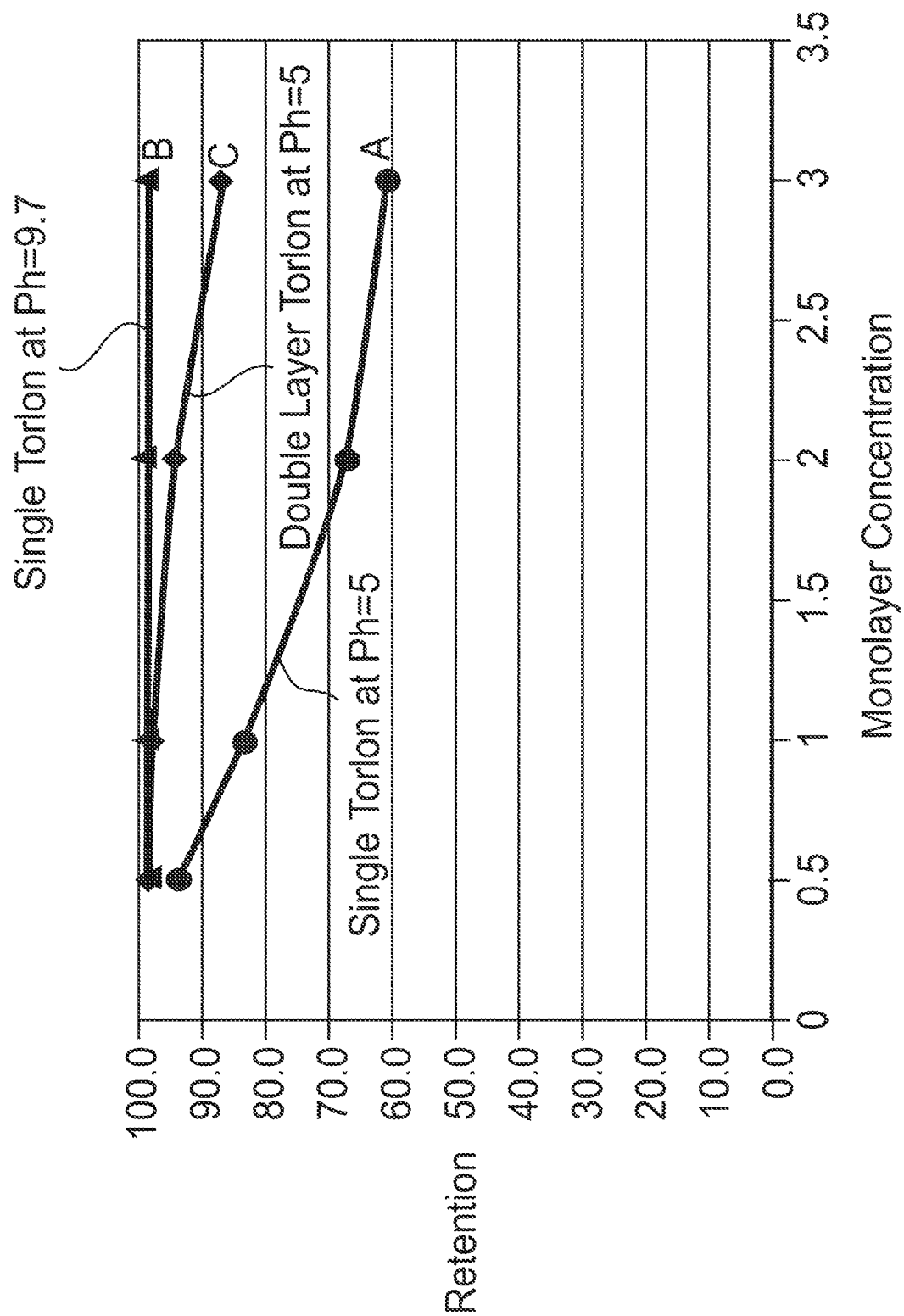
FIG. 10 is a graph showing retention performance of membranes as a function of monolayer concentration in accordance with an embodiment of the invention.

FIG. 10 is a graph showing retention performance of the membranes 100 as a function of monolayer concentration. Ninety mm coupon membranes were challenged with an aqueous solution containing 8 ppb G25 PSL particles with 0.1% Triton X-100 surfactants. Samples of the permeate were collected at different time intervals corresponding to different monolayer coverage of the membrane surface. The permeate samples were analyzed afterwards to measure the concentration of the G25 particles in the permeate sample and the corresponding membrane retention.

Line A is a single polyamide-imide polymer membrane 100 made by Example 2c tested at pH=5. Line B is a single polyamide-imide polymer membrane made by Example 2c tested at pH=9.7. Line C is a double layer polyamide-imide polymer membrane 100 made by Example 2c tested at pH=5. The double layer polyamide-imide polymer membrane 100 was laminated together in a configuration in which the tight layer 10 sides of the respective membranes 100 are in contact with each other. It should be appreciated that embodiments of the invention include a plurality of layers, and each layer in independent configuration with a given contact layer. For example: two other configurations include an open layer 20 of one membrane 100 in contact with a tight layer 10 of another membrane 100 and an open layer 20 of one membrane 100 in contact with an open layer 20 of another membrane 100.

Figure 11:
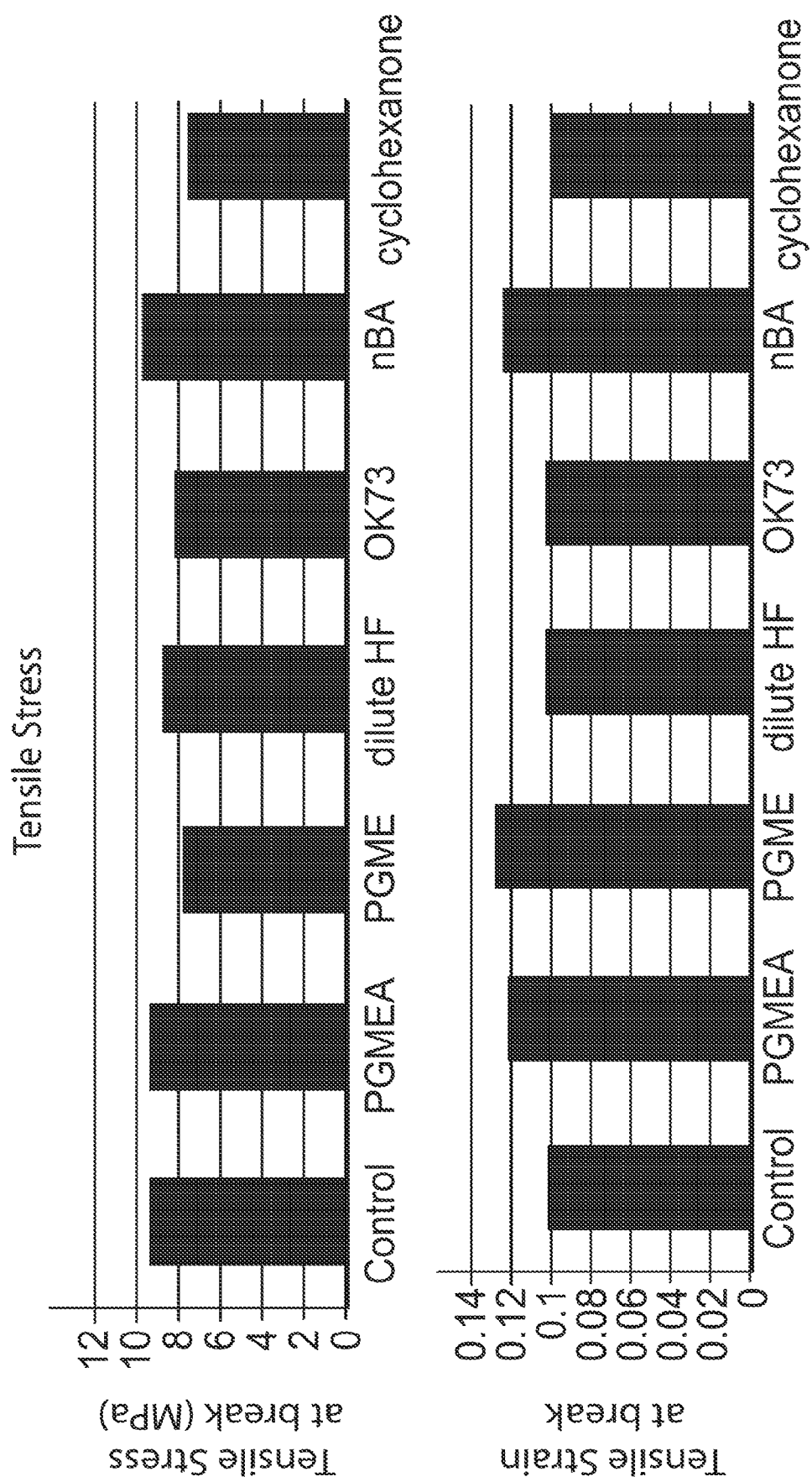
FIG. 11 are graphs showing tensile stress and tensile strain of membranes at break of membranes at break in accordance with embodiments of the invention.
Figure 12B:
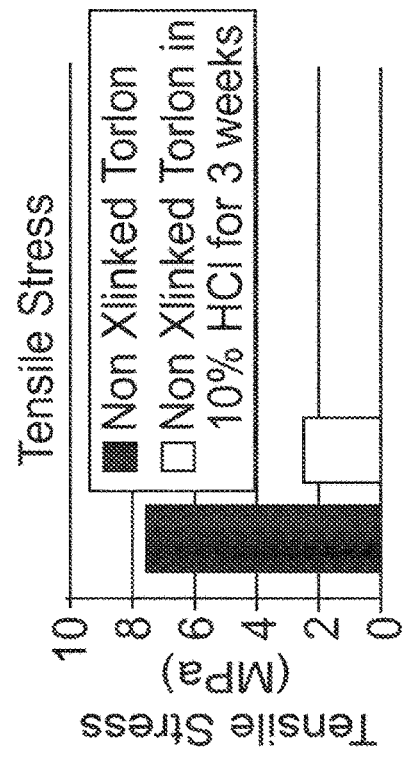
FIG. 12A-D are graphs showing tensile strength of membranes in accordance with embodiments of the invention.
Figure 12D:
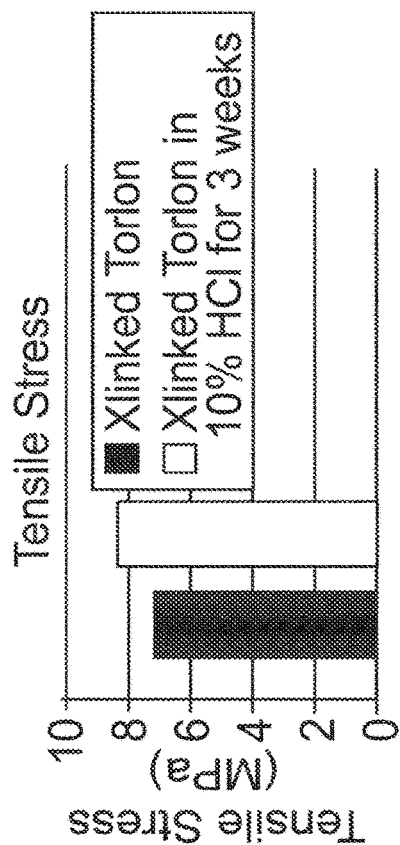
Figure 12A:
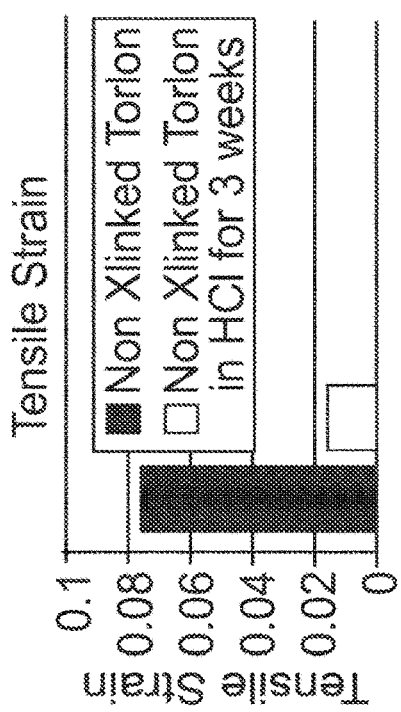
Figure 12C:
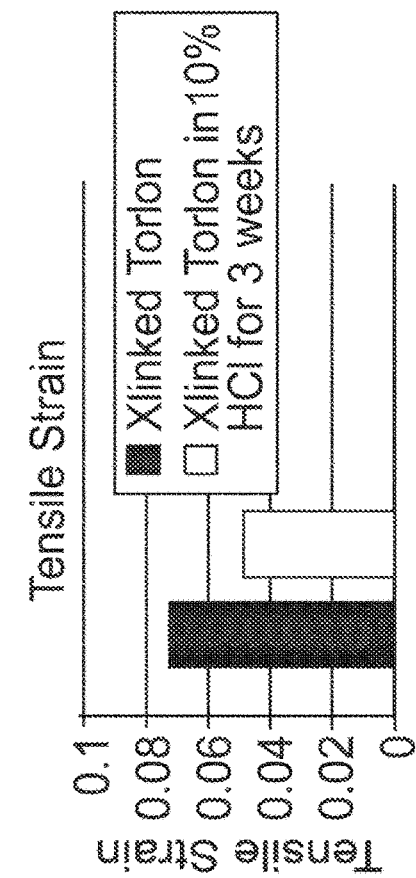

FIG. 11 are graphs comparing the tensile stress at break and tensile strain at break. A control, polyamide-imide polymer membrane 100 made according to Example 2c, and similar membranes were soaked in different solvents including cyclohexanone, n-butyl acetate (nBA), Propylene glycol mono-methyl ether (PGME), propylene glycol mono-methyl ascetate (PGMEA), OK73 (70% PGME, 30% PGMEA), dilute (2%) hydrofluoric acid (HF) for 3 weeks. The sample membranes were cut in 1"×4.5" dimensions and soaked in the solvents for three weeks. Later the membranes were immersed in isopropyl alcohol (IPA) for a few minutes and then dried in air. The dried samples were tested for tensile strength using an Instron™ Model 3342 Compression/Tensile instrument.

FIG. 12 are also graphs showing tensile strength. In this test, the polyamide-imide membrane made by method explained in Example 2c was thermally cross-linked by heating at 250° C. inside an oven for 6 hours. The cross-linked and non-cross linked membranes were soaked in 10% HCl solution for three weeks and then dried in air. The HCl treated membranes and the control membrane were tested for tensile strength using the method explained earlier.

The membranes 100 made through embodiments of the invention also have nonsieving ion removal capability, which can be used for impurity removal from a variety of liquids, such as but not limited to, the semiconductor manufacturing field.

Metal ion removal capability of a microporous polyamide-imide membrane 100 was tested. A 47 millimeter diameter sample of polyamide-imide membrane 100 was cleaned with 10 weight % HCl. The cleaned microporous polyamide-imide membrane 100 was soaked in ultrapure IPA and then was placed in a sample of cyclohexanone containing metals (cyclohexanone blank). After soaking in cyclohexanone for 24 hours, the soaked cleaned microporous polyamide-imide membrane 100 was removed and analyzed for metals by ICPMS-Ashing of the microporous polyamide-imide membrane 100. The microporous polyamide-imide membrane 100 was challenged with cyclohexanone containing at least 48.8 ppb of sodium, 1.2 ppb magnesium, 0.79 ppb of aluminum, 3.7 ppb of potassium, 45.7 ppb of calcium, 0.07 ppb Titanium, 27.9 ppb chromium, 2.3 ppb of iron, and 1.38 ppb of zinc. In an embodiment, the membrane 100 had a metal capacity above a control cleaned membrane of at least 31 nanograms per centimeter squared of membrane area for sodium. In another embodiment, the membrane 100 had a metal capacity above the control cleaned membrane of at least 14 nanograms per centimeter squared of membrane area for magnesium. In another embodiment, the membrane 100 had a metal capacity above the control cleaned membrane of at least 1.5 nanograms per centimeter squared of membrane area for aluminum. In another embodiment, the membrane 100 had a metal capacity above the control cleaned membrane of at least 8.7 nanograms per centimeter squared of membrane area for potassium. In another embodiment, the membrane 100 had a metal capacity above the control cleaned membrane of at least 95 nanograms per centimeter squared of membrane area for calcium. In another embodiment, the membrane 100 had a metal capacity above the control cleaned membrane of at least 1 nanogram per centimeter squared of membrane area for titanium. In another embodiment, the membrane 100 had a metal capacity above the control cleaned membrane of at least 2.8 nanograms per centimeter squared of membrane area for chromium. In another embodiment, the membrane 100 had a metal capacity above the control cleaned membrane of at least 1 nanogram per centimeter squared of membrane area for iron. In another embodiment, the membrane 100 had a metal capacity above the control cleaned membrane of at least 5.9 nanograms per centimeter squared of membrane area for zinc.

In an embodiment, the membrane 100 had a metal capacity above a control cleaned membrane for one or more metals, either individually or a combinations of two or more thereof when challenged with cyclohexanone containing at least 48.8 ppb of sodium, 1.2 ppb magnesium, 0.79 ppb of aluminum, 3.7 ppb of potassium, 45.7 ppb of calcium, 0.07 ppb Titanium, 27.9 ppb chromium, 2.3 ppb of iron, and 1.38 ppb of zinc.

While the invention has been described in detail in connection with only a limited number of aspects, it should be readily understood that the invention is not limited to such disclosed aspects. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A membrane comprising:
   a polyamide-imide polymer;
   wherein the membrane has an HFE (hydrofluoroether) mean bubble point from about 25 psi to about 200 psi, wherein the HFE mean bubble point is determined using ASTM F316-03(2011) with ethoxy-nonafluorobutane (HFE-7200); and
   the membrane is microporous, asymmetric and has a tight layer with a thickness of ≤10 microns.

2. The membrane of claim 1, wherein the HFE bubble point is in a range from about 25 psi to about 150 psi.

3. The membrane of claim 1, having an HFE bubble point from about 25 psi to about 100 psi.

4. The membrane of claim 1, further having an IPA flow time in a range from about 400 seconds to about 40,000 seconds, wherein the IPA flow time is the time to flow 500 ml of isopropyl alcohol at a temperature of 21° C. and a pressure of 0.1 MPa through a 47 mm disk of the membrane having an area of 12.5 cm$^2$.

5. The membrane of claim 4, wherein the IPA flow time is in a range from about 2800 second to about 11,000 seconds.

6. The membrane of claim 1, wherein the tight layer has a thickness of less than about 8 microns.

7. The membrane of claim 1, wherein the membrane has a calcium metal capacity of at least 95 nanograms per centimeter squared of membrane.

8. The membrane of claim 1, wherein the membrane has a zinc metal capacity of at least 5.9 nanograms per centimeter squared of membrane.

9. The membrane of claim 1, wherein the membrane has a sodium metal capacity of at least 31 nanograms per centimeter squared of membrane.

10. A filter device comprising:
    a filter incorporating a membrane comprising a polyamide-imide polymer;
    wherein the membrane has an HFE (hydrofluoroether) mean bubble point from about 25 psi to about 200 psi, wherein the HFE mean bubble point is determined using ASTM F316-03(2011) with ethoxy-nonafluorobutane (HFE-7200); and
    the membrane is microporous, asymmetric and has a tight layer with a thickness of ≤10 microns.

* * * * *